United States Patent [19]

Fuehrer

[11] Patent Number: 4,998,909
[45] Date of Patent: Mar. 12, 1991

[54] PLANET CARRIER ASSEMBLY
[75] Inventor: Reece R. Fuehrer, Danville, Ind.
[73] Assignee: General Motors Corporation, Detroit, Mich.
[21] Appl. No.: 513,410
[22] Filed: Apr. 23, 1990
[51] Int. Cl.[5] ............................................. F16H 3/44
[52] U.S. Cl. .................................... 475/331; 475/348
[58] Field of Search .................. 475/331, 348; 74/467
[56] References Cited

U.S. PATENT DOCUMENTS

| 2,959,073 | 11/1960 | Doerfer et al. | 475/348 |
| 3,821,908 | 7/1974 | Marsch et al. | 475/348 |
| 4,901,601 | 2/1990 | Leggat | 475/331 |

FOREIGN PATENT DOCUMENTS 2040015  8/1980  United Kingdom ............... 475/348

Primary Examiner—Dwight Diehl
Assistant Examiner—William O. Trousdell
Attorney, Agent, or Firm—Donald F. Scherer

[57] ABSTRACT

A planet carrier assembly has a pair of spaced parallel side plates interconnected by body portions with a plurality of aligned aperture pairs formed in the side plates for receiving mounting spindles on which pinion gear members are rotatably supported. Each spindle has a shoulder which contacts a locating surface on one side plate to limit axial movement of the spindle in one direction relative to the side plates. A segmental space is provide at the longitudinal end of each spindle adjacent the shoulder and each space is arranged such that a flat surface thereof faces radially outward at assembly. A retainer plate having complementary radially extending locating surfaces cooperate with the flat surface of the segmental spaces to limit rotation of the spindle relative to the side plates. A retaining ring is secured in one side plate adjacent the retainer plate to limit axial movement of the spindles in the other direction relative to the side plates.

2 Claims, 2 Drawing Sheets

PLANET CARRIER ASSEMBLY

BACKGROUND OF THE INVENTION

This invention relates to gear assemblies, and more particularly, to planetary carrier gear assemblies.

Specifically, this invention relates to planetary gear assemblies wherein the mounting spindles for the pinion gears are limited in relative rotary and axial movement in the carrier assembly. The prior art gear carrier structures generally prevent relative rotation and axial movement of the spindles by welding or staking the spindles to the carrier side plates.

An improvement on this assembly is disclosed in U.S. Pat. No. 4,756,212 issued to Fuehrer, July 12, 1988, and assigned to the assignee of the present invention. The Fuehrer patent teaches the use of a flat surface and a locking ring disposed in combination to limit the rotary motion and axial motion of the spindle relative to the carrier in one direction. The spindles are mounted in aligned apertures, wherein the one opposite the locking ring structure is drilled with a stepped diameter to limit the axial motion in one direction. This structure requires some care in the drilling of the stepped diameter, since the shoulder created by such structure has to be maintained within a predetermined distance from the retaining ring locating structure in order that excess axial movement does not occur.

SUMMARY OF THE INVENTION

The present invention provides an improvement over the prior art by establishing the rotary and axial movement constraints on one end of the spindle structure. This permits the mounting apertures in the carrier to be a single constant diameter which allows reduced manufacturing cost. The relative rotary motion of the spindle within the carrier is constrained by an axially extending flat surface on the spindle, and a retaining plate having a complementary cooperating surface. The relative axial motion is constrained in one direction by a shoulder formed on the spindle adjacent the flat surface, and a retaining ring secured in the side plate and in axial abutment with the retaining ring. This improvement permits one of the carrier side plates to be made thinner than is possible with the prior art, thereby reducing the axial length of the carrier assembly and simultaneously reducing the weight and material usage.

It is therefore an object of this invention to provide an improved planet carrier assembly, wherein the pinion gears are rotatably mounted between side plates on cylindrical spindles having structure on one end thereof, for constraining the rotary and axial movement of the spindles relative to the, carrier.

It is another object of this invention to provide an improved planet carrier assembly as defined in the preceding object, wherein each spindle has a radially extending shoulder on the one end and a longitudinally extending flat surface, radially opposite the shoulder, and further wherein the shoulder cooperates with one side plate to limit axial movement in one direction and the flat surface cooperates with a retainer plate having a complementary flat surface and a retaining ring secured in the side plate to limit axial movement in another direction and to also limit rotary movement of the spindle relative to the side plate.

It is a further object of this invention to provide an improved retaining and movement limiting structure for a planet pinion carrier assembly having spaced side plates with pinion gears rotatably supported on spindles therebetween, wherein each spindle has a shoulder structure abutting a locating surface on one side plate and a longitudinally extending flat surface adjacent the shoulder, and further wherein a retainer plate having a complementary flat surface and a retaining ring secured in the one side plate cooperate with the spindle to limit rotary and axial movement of the spindle relative to the side plate.

These an other objects and advantages of the present invention will be more readily apparent from the following description and drawings

DESCRIPTION OF THE EMBODIMENTS

Figure 1:
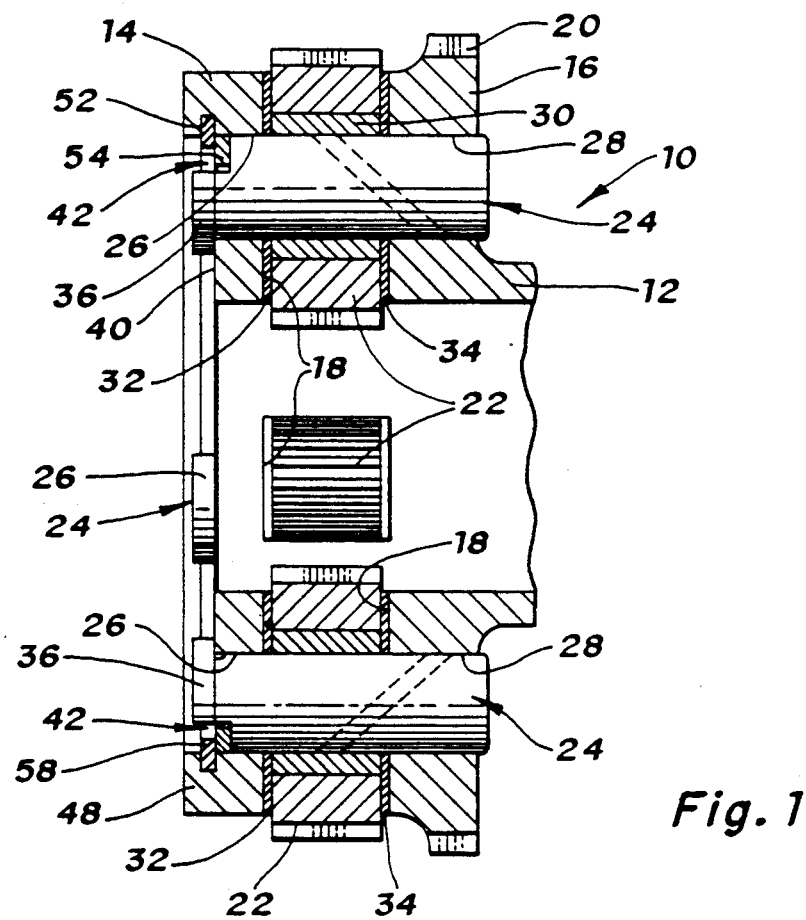
FIG. 1 is a cross-sectional elevational view of a carrier assembly incorporating an exemplary embodiment of the present invention.

Referring to the drawings, there is seen in FIG. 1, a planet pinion carrier assembly, generally designated 10, having a central body portion 12 and a pair of radially extending side walls or plates 14 and 16 which are formed integrally with the body 12. The body 12 has a plurality of openings 18 between the side plates 14 and 16. The side plate 16 has a splined or toothed outer surface 20 which will permit the carrier assembly 10 to be drivingly connected to other components, such as a clutch, a brake or another planetary gear arrangement within a power transmission.

A plurality of pinion gears 22 are rotatably mounted on spindles 24 which are supported in the side plates 14 and 16. The spindles 24 are generally cylindrical in shape and are disposed in apertures 26 and 28 in the side plates 14 and 16, respectively.

Figure 2:
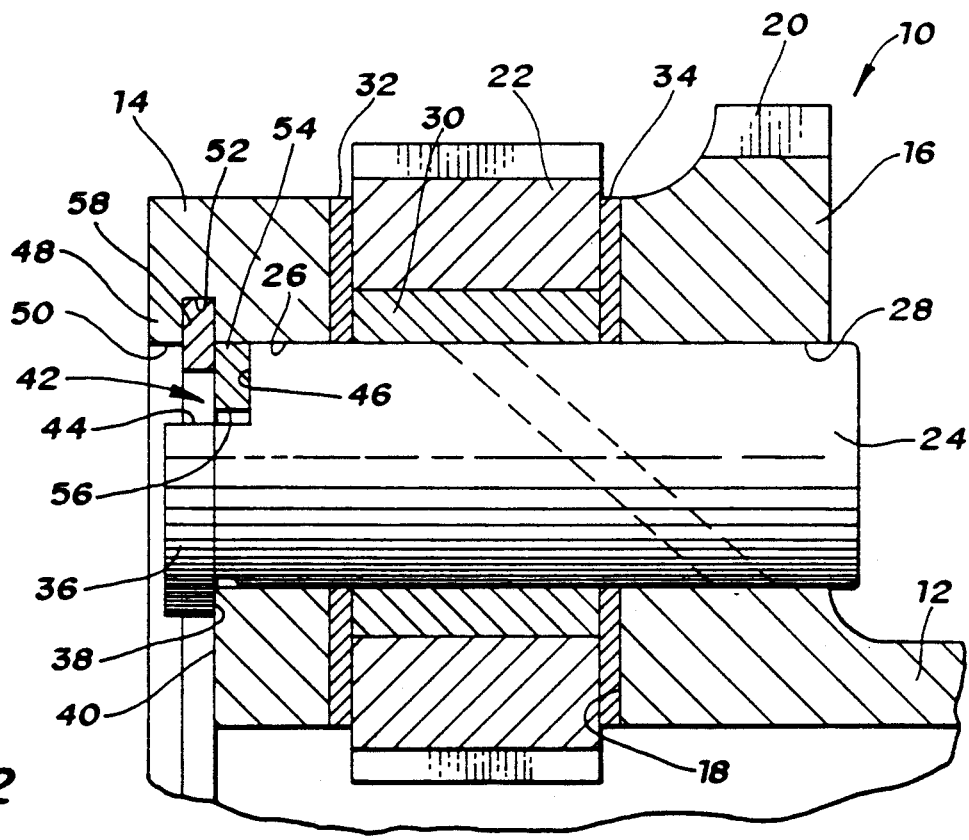
FIG. 2 is an enlarged sectional view of a portion of FIG. 1.

As can be seen in FIGS. 1 and 2, these apertures 26 and 28 are formed in pairs and are axially aligned to permit assembly of the spindle 24 with the body 12. The pinion gears 22 are rotatably mounted on the spindles 24 by a bushing 30. In the alternative, the bushing 30 can be replaced with needle bearings should this be desirable in a particular gear assembly A pair of thrust washers 32 and 34 are disposed between the pinion gears 22 and the side plates 14 and 16, respectively. As is well known, the pinion gears 22 quite often have helical teeth such that side loading of the pinions occurs during power transmission. This side loading is accommodated by the bearings. or thrust washers 32 and 34. Each spindle 24 has formed on one end thereof, a shoulder 36 having a slightly larger diameter than the remainder of the spindle 24.

A side wall 38 of the shoulder 36 is placed in abutment with a locating surface 40 formed on the side plate 14. As seen in FIGS. 1 and 2, the shoulder 36 cooperates with the side wall 38 to limit rightward axial or longitudinal movement of the spindle 24 relative to the body 12. The spindle 24 has formed therein a segmental space or cut out 42 radially adjacent the shoulder 36. The segmental space 42 has a longitudinally extending flat surface 44 and a radially extending flat surface 46.

The side plate 14 has an outer annular extension 48 having an inner diametral surface 50 from which is presented a radially outwardly extending groove 52. A retainer plate 54 is disposed axially adjacent the surface 46 and radially adjacent the diametral surface 50.

Figure 3:
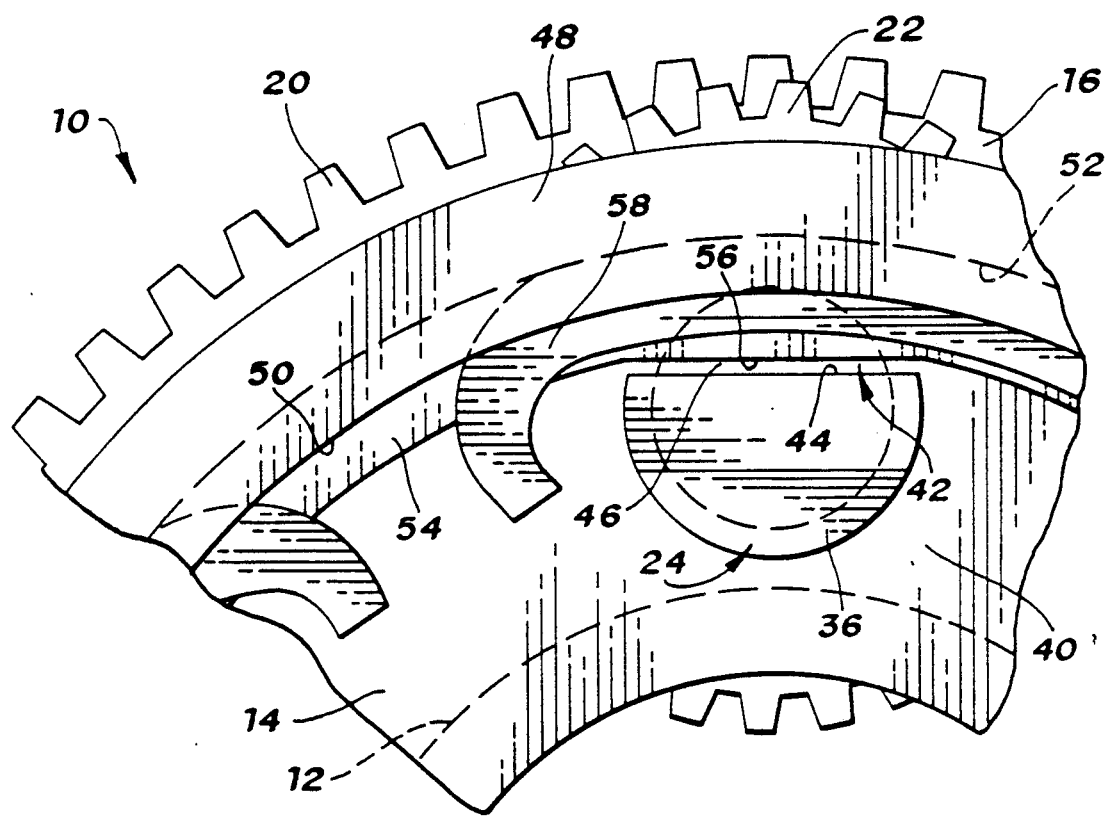
FIG. 3 an end view of the structure shown in FIG. 2.

As seen best in FIG. 3, the retainer plate 54 is generally annular with the inner surface thereof interrupted at spaced locations by flat or chordal surfaces 56. The flat surfaces 56 are complementary to the surfaces 44 and, as best seen in FIG. 3, will cooperate therewith to limit the rotary motion of the spindle 24 relative to the side plates 14 and 16.

A retaining ring 58 is disposed in the groove 52 adjacent the retainer plate 54, as best seen in FIGS. 1, 2 and 3. The retaining ring 58 cooperates with the retainer plate 54 and the flat surface 46 on the spindle 24 to limit the leftward axial or longitudinal movement of the spindle 24 relative to the body 12.

Figure 4:
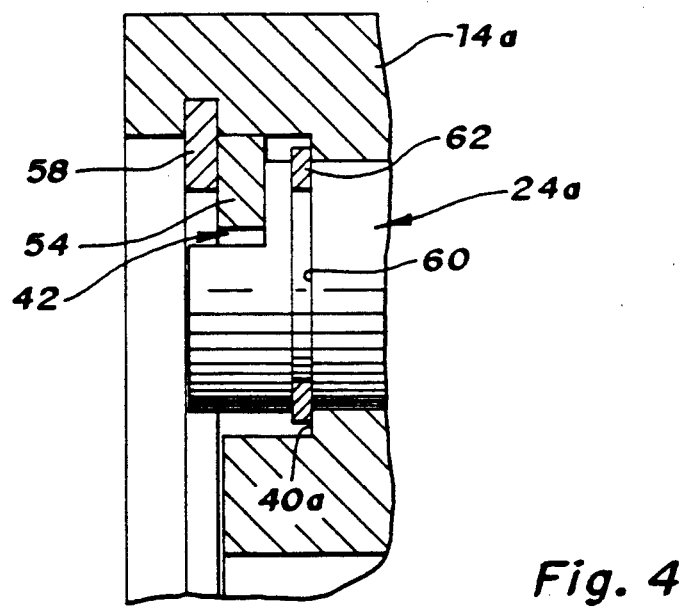
FIG. 4 is a view similar to FIG. 2 depicting an alternative embodiment of the spindle retainer of the present invention.

FIG. 4 depicts an alternate embodiment of the invention, wherein a spindle 24a has a segmental space 42 which cooperates with a retainer plate 54 and a retaining ring 58 to limit the rotary movement of the spindle 24a and the leftward axial movement of the spindle 24a relative to a carrier having a side plate 14a. The side plate 14a has formed therein a plurality of cylindrical annular locating surfaces 40a which are coaxial with the axis of the respective spindles 24a. The spindle 24a has formed therein a groove 60 in which is disposed a locking ring 62. The locking ring 62 cooperates with the spindle 24a to establish a shoulder which is formed longitudinally adjacent the segmental space 42 and is disposed in abutment with the locating surface 40a to limit the rightward axial movement of the spindle 24a.

It should be readily apparent after reviewing the above disclosure, that spindles 24 and 24a are constrained from relative motion both axial and rotary relative to the side walls and body of the carrier assembly 10. It should also become apparent from the above description that the structure which defines the constraints for the limited motion retention is associated with a single longitudinal end of the spindles 24 and 24a. Therefore, the machining functions or operations which must be undertaken to provide the assembly control surfaces are limited to a very small portion of the carrier structure.

The amount of axial constraint will generally be controlled by the retainer plate 54. If desired, this plate can be provided in a number of thickness such that the axial motion of the spindles 24 and 24a can be closely controlled in assembly. In the alternative, the retainer plate 54 might be comprised of a plurality of plate members or shims which are installed selectively to control the axial motion of the spindles.

The embodiments of the invention in which an exclusive property or privilege is claimed are defined as follows:

1. A planet carrier assembly comprising: a pair of side plates disposed in axial spaced relation, each side plate having a plurality of apertures of substantial equal diameter; means for securing the side plates with the apertures in one of said side plates in axial alignment with the apertures in the other of said side plates; a plurality of spindle means having a constant diameter body portion, shoulder means adjacent one end of the body portion and locating flat means formed in a segmental space in said one end of said body portion; a locating surface on said one side plate coaxial with and adjacent each aperture in said one side plate and extending radially therefrom; said spindle means being disposed respectively in each pair of said apertures with said shoulder means being in abutment with said locating surface; a pinion gear rotatably supported on each of said spindle means; a retainer plate having alignment surface means disposed adjacent and radially outward from said locating flat means on each of said spindles for cooperating therewith to prevent rotation of said spindles in said apertures; and a retaining ring secured in said one side plate in axial abutment with said retainer plate and cooperating therewith to prevent axial movement to said spindles in one axial direction and said shoulder means cooperating with said locating surface to prevent axial movement of said spindles in an opposite axial direction.

2. A planet carrier assembly comprising: a pair of interconnected side plates disposed in axial spaced relation, each side plate having a plurality of apertures of substantial equal diameter disposed with the apertures in one of said side plates in axial alignment with the apertures in the other of said side plates; a plurality of spindle means having a constant diameter body portion, shoulder means adjacent one end of the body portion and longitudinal and radial locating flat means forming in a segmental space in said one end of said body portion radially opposite said shoulder means; a locating surface on said one side plate coaxial with and adjacent each aperture in said one side plate and extending radially therefrom; said spindle means being disposed in and extending between respective aligned pairs of said apertures with said shoulder means being in abutment with said locating surface; gear means rotatably supported on each said spindle means intermediate said side plates, a retainer plate having alignment surface means disposed adjacent and radially outward from said longitudinal locating flat means on each of said spindles for cooperating therewith to prevent rotation of said spindles in said apertures; and a retaining ring secured in said one side plate in axial abutment with said retainer plate and cooperating therewith to prevent axial movement to said spindles in one axial direction and said shoulder means cooperating with said locating surface to prevent axial movement of said spindles in an opposite axial direction.

* * * * *